United States Patent

Harris et al.

[15] 3,697,974
[45] Oct. 10, 1972

[54] LATCHING WARNING DEVICE FOR FIFTH WHEEL ASSEMBLIES

[72] Inventors: Julian Taylor Harris; Thomas Adkins Turner, both of Columbus, Ga.

[73] Assignee: Fountain City Safety Corporation, Washington, D.C.

[22] Filed: Oct. 26, 1970

[21] Appl. No.: 83,738

[52] U.S. Cl. ............ 340/275, 180/111, 200/51.09, 280/432, 307/10
[51] Int. Cl. ............... G08b 23/00, B62d 53/10
[58] Field of Search....340/275, 274, 52 R; 200/51.1, 200/51.09, 61.64; 307/10 R; 180/111, 103, 82; 280/432, 433, 438 A, 438 R; 339/10

[56] References Cited

UNITED STATES PATENTS 3,535,679   10/1970   Connors .................... 340/275
2,797,406   6/1957    Tanis et al. ................. 340/52

Primary Examiner—John W. Caldwell
Assistant Examiner—Glen R. Swann, III
Attorney—Thomas A. Turner, Jr.

[57] ABSTRACT

A safety system is provided for fifth wheel assemblies or other trailer connecting devices which includes several switches connected to warning devices which are actuated to warn the operator of improper coupling conditions.

6 Claims, 1 Drawing Figure

PATENTED OCT 10 1972
3,697,974
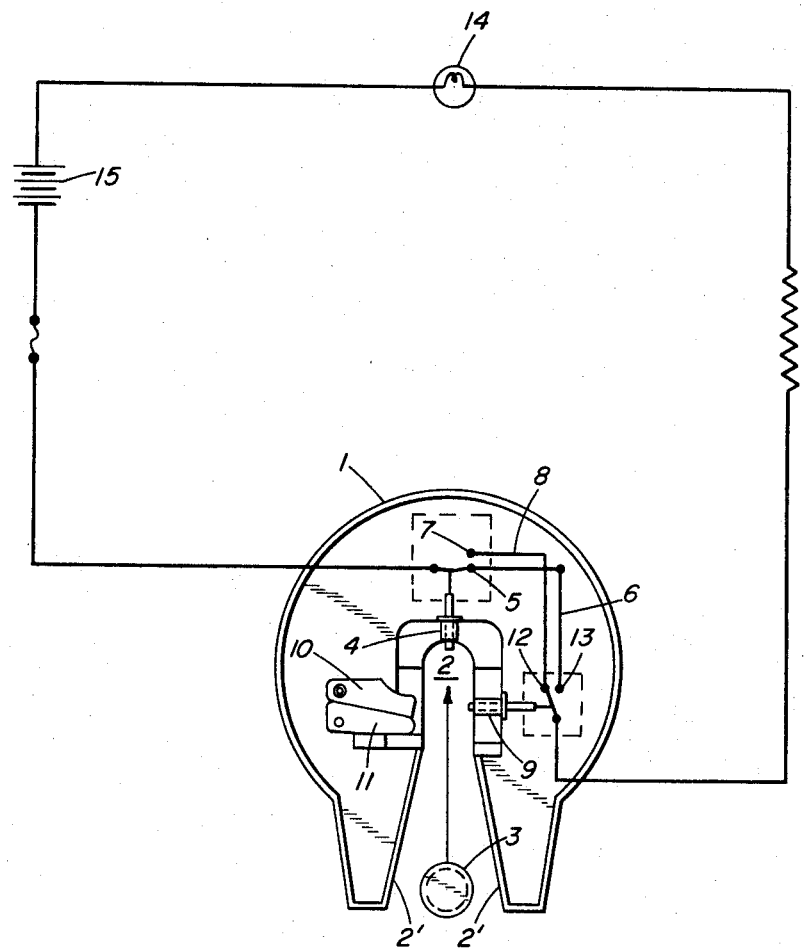
INVENTORS.
THOMAS ADKINS TURNER
JULIAN TAYLOR HARRIS
BY *James H. Laughlin Jr.*
ATTORNEY

LATCHING WARNING DEVICE FOR FIFTH WHEEL ASSEMBLIES

This invention relates to an improved safety device. More particularly, this invention relates to a safety device which is used to warn the operator of a vehicle designed to pull trailers or other load carrying devices of an improper trailer coupling condition. More specifically this invention is directed to a safety signaling system which may be employed with fifth wheel assemblies and other coupling devices.

Many devices are known to connect tractors or other load-pulling vehicles to trailers, vans, or other load-carrying devices. The connection between the two vehicles may be of ball and socket design or simply a stationary rigid bar connection. However in larger vehicles which are designed to carry heavy loads, the connection between tractor and trailer is usually made by a connecting device normally referred to as a fifth wheel assembly.

A fifth wheel assembly is usually formed by a base plate which is usually horizontal in assembly and attached to the rear of the tractor. The base plate is approximately circular in design, having an opening cut therein to receive a king pin which is a vertical rod that protrudes downward from the front bottom of the trailer. The tractor mounted base plate contains a latching system consisting of latching jaws and a lock mechanism designed to keep the jaws from sliding open once the king pin is properly inserted into the assembly. The purpose of the latching jaws when locked is to keep the king pin safely secured in the fifth wheel assembly.

As can be readily recognized, dangerous condition exists when the king pin does not sufficiently position itself in the fifth wheel assembly and thus cannot be properly locked into place. This condition may arise upon initial failure of the latching jaws to properly close and lock, or upon premature closing of the latching jaws, thus prohibiting the proper positioning of the king pin. A dangerous condition also arises if the locking jaws accidentally break open.

It is an object of this invention to provide a safety device for trailer coupling. It is a further object of this invention to provide a signal system designed to warn an operator when the trailer is not properly coupled to the tractor or when a proper coupling is in danger of disengaging. It is further an object of this invention to provide a warning system to show that proper trailer engagement may not be made. Other objects and advantages will become apparent from a reading of the ensuing specification.

This invention contemplates a signal system employing visual, audible, or other signaling means designed to warn operators employing fifth wheel assemblies and other coupling means that a proper coupling connection has not been made; that is, when the king pin is not properly secured within the fifth wheel assembly. The invention also contemplates a second system operation to warn the operator that the latching mechanism is not in proper position for trailer coupling. The invention also contemplates a signaling system designed to forewarn of separation between the tractor and trailer during operation.

BRIEF DESCRIPTION OF THE DRAWING

The FIG. illustrates an electro-mechanical representation of the invention.

DESCRIPTION OF THE PREFERRED EMBODIMENTS

The FIG. is a top view of an open or uncoupled fifth wheel assembly showing the essential features of this invention. This figure also shows a schematic diagram of the circuit which may be employed with the present invention.

Referring now to the drawings, the invention includes a conventional fifth wheel assembly having a base plate 1 with an opening 2 bounded by sides 2' for receiving king pin rod 3 from a trailer or other load-carrying device.

Sides 2' are normally machined or otherwise constructed with a grove or groves (not shown) therein so that the base plate will exactly receive the king pin. The king pin 3 is normally machined or otherwise constructed so that along its longitudinal axis the radius will vary. Inside the opening 2 in the base plate at the farther point from the entrance of the base plate and deeply recessed within, a first switch 4 is placed. When the assembly is normally open, this first switch which is of a single-throw, double pole, spring biased type is in position 5 with circuit lead 6 connected thereto. When the king pin is properly positioned within opening 2 and the assembly is closed, the switch is closed against the biased spring and positioned at 7 which connects to circuit lead 8. A second switch 9 which operates like the first is placed within an opening along one of the sides 2' opposite locking jaws 10 and 11. This second switch 9 when latching jaws 10 and 11 are open is in the position 12 which is attached to lead 8. When the locking jaws 10 and 11 are in a closed position, switch 9 is in position 13 which is attached to lead 6. The switches are connected to a signal means 14 which may be a light, horn, and/or other mechanism which is positioned in the tractor in full view of the senses of the operator and a normal energy or battery source 15 which is attached to the tractor (not shown). The switches are connected to each other in such a way that two separate series circuits are defined.

When the king pin 3 properly fits into the opening 2, the first switch 4 is in its actuated position 7. When the latching jaws 10 and 11 close so as to lock the king pin 3 into secure position within the opening 2, the second switch 9 is actuated to position 13.

In positioning switches 4 and 9, the first switch 4 must be actuated by a properly inserted king pin 3, and the second switch must be actuated by at least one of the latching jaws 10 and 11. It does not matter whether a push rod or plunger type actuator is used as shown in the drawing, or whether a lever type actuator or any other type actuator for a switch which commonly found on the market presently is used.

Now it can be seen from the drawing that when the first switch 4 is in its position 5 and the second switch 9 is in its position 13, the electrical circuit connecting power source 15 and the signal 14 are connected in series and the signal 14 will alarm the operator. Also, as can be seen from the drawings, when the first switch 4 is in its position 7 and when the second switch 9 is in its position 12, again the electrical power source 15 is connected in series with the signal 14 and the signal 14 will alarm the driver. However, if both the first switch 4 and the second switch 9 are in their respective position 5–12 or 7–13, it can be readily seen from the drawings that the signal 14 will not be electrically connected to the tractor electrical power source 15 and the signal 14 will not be actuated.

It can be seen that if the king pin 3 is properly seated within the opening 2 and if the latching jaws 10 and 11 are properly closed so as to secure the king pin 3 in its position, then the first switch 4 is in its position 7 and the second switch 9 is in its position 13, and the signal 14 will not be actuated and will not alarm. If for any reason latching jaws 10 and 11 which actuate switch 9 to position 13 even slightly becomes loose from its secured position, then switch 9 will open to position 12 while the first switch 4 remains in its position 5. In this situation the signal 14 will be actuated to forwarn the operator that a dangerous condition exists.

When a trailer is not attached to the tractor and consequently the king pin 3 is not seated within the fifth wheel assembly, switch 4 is in its position 5. Under these circumstances the latching jaws 10 and 11 should properly be in their opened position and second switch 9 is in its position 12. Here signal 14 is not electrically connected to the tractor electrical power source 15 and the signal 14 will not be actuated and will not alarm.

If the tractor is not hitched to the trailer, and the latching jaws 10 or 11 are jarred into their closed position before the king pin 3 is seated properly into the opening 2, then the first switch 4 is in its position 5 while the second switch 9 is in its position 13. As can be seen, signal 14 will be actuated and give alarm.

Frequently the latching jaws 10 and 11 will close as the tractor is being backed up under the trailer just before the king pin 3 slides into its position within the opening 2, or sometimes the king pin 3 will slide up over the latching jaws 10 and 11 and up over the base plate 1 and fall improperly and unsecurely into the hole left by the base plate 1 and the closed latching jaws 10 and 11. Because it is most difficult for the driver to visually observe the actual connection itself, the illusion of a proper connection may be believed. The weight of the trailer may subsequently hold the trailer temporarily onto the tractor. However, as the tractor with its trailer literally hanging travels over normally rough roads and highways, the trailer may jar loose and become a dangerous and free moving vehicle. This improper connection, however, can be immediately noticed when this invention is employed. In fact, when the latching jaws 10 and 11 close prematurely, the driver is immediately warned. Thus, he can properly open the jaws before backing his tractor up under the trailer and prevent possible damage to the king pin 3 or to the fifth wheel coupling assembly.

Now it will be obvious to those skilled in the art that there are many variations on this basic invention which will, when employed, give results similar to those sought herein. For example, the switches which are a part of this invention could be actuated by a push rod type actuator, a lever type actuator, a pressure sensitive type actuator or any type actuator commonly found on the market. Furthermore the base plate itself may have a different type configuration and even a ball and socket connection could be employed within the scope of this invention. If switches are positioned so that an alarm will be actuated when the connector does not seat properly or when the latching jaws prematurely close, the objects of this invention will have been achieved.

The invention has been generally described as heretofore shown, but it should not be limited to the description except by the appended claims.

We claim:

1. In a trailer latching means, a first switch actuated by the trailer connection in series with a second switch actuated by a latching means said first switch and said second switch selectively connected in series with a signal means.

2. A safety alarm system for a two vehicle connection connecting two vehicles comprising:
   A. an electrical energy source;
   B. a first switch means selectively connected in series with said energy source, said first switch means being positioned in a female part of one of said two vehicles, said first switch means actuable by a male part on the other of said two vehicles;
   C. a second switch means actuable by securing means for said male part, said second switch means selectively connected in series with said energy source and said first switch means;
   D. warning means selectively connected in series with said electrical energy source, said first and said second switch means;
   E. said first switch means and said second switch means being connected in series electrically upon actuation of one but not both said switch means.

3. The safety alarm system of claim 2 wherein the first switch is actuated by a king pin connection.

4. The device as claimed in claim 2, wherein said male part comprises a king pin and said female part comprises a fifth wheel assembly.

5. The device as claimed in claim 2, wherein said first switch means and said second switch means comprise single pole double throw switches, and said device further comprising between said first switch means and said second switch means two electrical connections selectively connected by said first and said second switch means.

6. The device as claimed in claim 5, wherein the pole of said first switch means and the pole of said second switch means are positioned so that said first switch means and said second switch means are connected in series electrically upon actuation of one but not both said switch means.

* * * * *